(12) United States Patent
Droppo et al.

(10) Patent No.: US 10,460,727 B2
(45) Date of Patent: Oct. 29, 2019

(54) MULTI-TALKER SPEECH RECOGNIZER

(71) Applicant: Microsoft Technology Licensing, LLC, Redmond, WA (US)

(72) Inventors: James Droppo, Carnation, WA (US); Xuedong Huang, Bellevue, WA (US); Dong Yu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 15/602,366

(22) Filed: May 23, 2017

(65) Prior Publication Data

US 2018/0254040 A1 Sep. 6, 2018

Related U.S. Application Data

(60) Provisional application No. 62/466,902, filed on Mar. 3, 2017.

(51) Int. Cl.
| | |
|---|---|
| *G10L 15/20* | (2006.01) |
| *G10L 21/0308* | (2013.01) |
| *G10L 15/06* | (2013.01) |
| *H04R 3/00* | (2006.01) |
| *G10L 25/51* | (2013.01) |
| *G10L 25/30* | (2013.01) |
| *G10L 17/04* | (2013.01) |
| *G10L 17/18* | (2013.01) |
| *G10L 15/32* | (2013.01) |

(52) U.S. Cl.
CPC ............ *G10L 15/20* (2013.01); *G10L 15/063* (2013.01); *G10L 17/04* (2013.01); *G10L 17/18* (2013.01); *G10L 21/0308* (2013.01); *G10L 25/30* (2013.01); *G10L 25/51* (2013.01); *H04R 3/005* (2013.01); *G10L 15/32* (2013.01)

(58) Field of Classification Search
None
See application file for complete search history.

(56) References Cited

U.S. PATENT DOCUMENTS 7,295,970 B1 * 11/2007 Gorin .................. G10L 17/12
704/221
7,464,029 B2    12/2008 Visser et al.
(Continued)

OTHER PUBLICATIONS

Hardesty, Larry, "Automatic speaker tracking in audio recordings", http://news.mit.edu/2013/automatic-speaker-tracking-in-audio-recordings-1018, Published on: Oct. 18, 2013, 3 pages.
(Continued)

*Primary Examiner* — Thuykhanh Le
(74) *Attorney, Agent, or Firm* — International IP Law Group, PLLC (57) ABSTRACT

Various systems and methods for multi-talker speech separation and recognition are disclosed herein. In one example, a system includes a memory and a processor to process mixed speech audio received from a microphone. In an example, the processor can also separate the mixed speech audio using permutation invariant training, wherein a criterion of the permutation invariant training is defined on an utterance of the mixed speech audio. In an example, the processor can also generate a plurality of separated streams for submission to a speech decoder.

21 Claims, 6 Drawing Sheets

(56) References Cited

U.S. PATENT DOCUMENTS

| | | | |
|---|---|---|---|
| 8,160,270 B2* | 4/2012 | Oh | H04R 1/406 381/92 |
| 9,082,403 B2* | 7/2015 | Ju | G10L 15/1822 |
| 9,390,712 B2* | 7/2016 | Yu | G10L 15/16 |
| 10,049,308 B1* | 8/2018 | Dhua | G06K 9/4628 |
| 2002/0116179 A1* | 8/2002 | Watanabe | G10L 19/02 704/200.1 |
| 2004/0086185 A1* | 5/2004 | Sun | G06F 16/5838 382/224 |
| 2005/0043830 A1* | 2/2005 | Lee et al. | G10L 19/018 700/94 |
| 2006/0056647 A1* | 3/2006 | Ramakrishnan | G10L 21/0272 381/119 |
| 2007/0225967 A1* | 9/2007 | Childress | G10L 13/00 704/9 |
| 2008/0319743 A1* | 12/2008 | Faisman | G10L 15/065 704/235 |
| 2009/0099841 A1 | 4/2009 | Chen | |
| 2010/0196861 A1* | 8/2010 | Lunner | H04R 25/505 434/112 |
| 2013/0035935 A1* | 2/2013 | Kim | G10L 21/0264 704/233 |
| 2013/0136282 A1* | 5/2013 | McClain | H03G 3/32 381/316 |
| 2013/0262111 A1* | 10/2013 | Eller | G10L 15/26 704/235 |
| 2014/0142944 A1* | 5/2014 | Ziv | G10L 17/02 704/250 |
| 2014/0257803 A1* | 9/2014 | Yu | G06N 3/0481 704/232 |
| 2014/0288932 A1* | 9/2014 | Yeracaris | G10L 15/30 704/249 |
| 2015/0006168 A1* | 1/2015 | Mysore | G10L 25/84 704/233 |
| 2015/0058018 A1 | 2/2015 | Georges et al. | |
| 2015/0066499 A1* | 3/2015 | Wang | G10L 25/30 704/233 |
| 2015/0095026 A1 | 4/2015 | Bisani et al. | |
| 2015/0127327 A1* | 5/2015 | Bacchiani | G10L 25/30 704/202 |
| 2015/0199954 A1* | 7/2015 | Ukai | G10K 11/175 381/73.1 |
| 2015/0269933 A1* | 9/2015 | Yu | G10L 15/16 704/232 |
| 2015/0348546 A1* | 12/2015 | Sun | G10L 21/02 704/233 |
| 2015/0381801 A1* | 12/2015 | Rajakumar | G10L 25/48 379/88.01 |
| 2016/0071526 A1* | 3/2016 | Wingate | G10L 21/028 704/233 |
| 2016/0073198 A1* | 3/2016 | Vilermo | H04R 5/027 381/26 |
| 2016/0093292 A1 | 3/2016 | Hofer et al. | |
| 2016/0111108 A1* | 4/2016 | Erdogan | G10L 21/0216 704/202 |
| 2016/0140956 A1* | 5/2016 | Yu | G10L 15/08 704/240 |
| 2016/0189730 A1* | 6/2016 | Du | G10L 21/0272 704/233 |
| 2016/0196828 A1* | 7/2016 | Germain | G10L 19/012 704/500 |
| 2016/0203828 A1* | 7/2016 | Gomez | G10L 15/20 704/226 |
| 2016/0227025 A1* | 8/2016 | Soby | H04M 19/026 |
| 2016/0284348 A1 | 9/2016 | Yu et al. | |
| 2016/0350611 A1* | 12/2016 | Zhang | G06K 9/00248 |
| 2017/0061978 A1* | 3/2017 | Wang | G10L 21/0232 |
| 2017/0110120 A1 | 4/2017 | Yu et al. | |
| 2017/0162194 A1* | 6/2017 | Nesta | G10L 25/30 |
| 2017/0193362 A1* | 7/2017 | Cremer | G06N 3/04 |
| 2018/0144264 A1* | 5/2018 | Ranzato | G06F 17/2785 |

OTHER PUBLICATIONS

Nakamura, et al., "3-D N-Best Search for Simultaneous Recognition of Distant-Talking Speech of Multiple Talkers", In Proceedings of the 4th IEEE International Conference on Multimodal Interfaces, Oct. 14, 2002, 5 pages.

Rennie, et al., "Single-Channel Multitalker Speech Recognition", In Journal of IEEE Signal Processing Magazine, vol. 27, Issue 6, Nov. 2010, pp. 66-80.

Smaragdis, Paris, "Convolutive Speech Bases and Their Application to Supervised Speech Separation", In Journal of IEEE Transactions on Audio, Speech, and Language Processing, vol. 15, No. 1, Jan. 2007, pp. 1-12.

Yu, et al., Related U.S. Appl. No. 15/226,527, filed Aug. 2, 2016, "Permutation Invariant Training for Speaker Independent Multi-talker Speech Separation and Tracing".

Weng, et al., "Deep neural networks for single-channel multi-talker speech recognition", In Journal of IEEE/ACM Transactions on Audio, Speech, and Language Processing, vol. 23, No. 10, Oct. 2015, pp. 1670-1679.

Xiao, et al., "Deep Beamforming Networks for Multi-Channel Speech Recognition", In Proceedings of IEEE International Conference on Acoustics, Speech and Signal Processing, Mar. 20, 2016, 5 pages.

Yamamoto, et al., "Real-Time Robot Audition System That Recognizes Simultaneous Speech in the Real World", In Proceedings of the IEEE/RSJ International Conference on Intelligent Robots and Systems, Oct. 9, 2006, pp. 5333-5338.

Yu, et al., "Permutation Invariant Training of Deep Models for Speaker-Independent Multi-Talker Speech Separation", In Journal of Computing Research Repository, Jul. 2016, 5 pages.

* cited by examiner

MULTI-TALKER SPEECH RECOGNIZER

BACKGROUND

Speech can be automatically recognized through automatic speech recognition ("ASR") systems. Words and other non-linguistic sounds can form utterances. Utterances can refer to separate pieces of audio between pauses. As used herein, utterances can refer to full sentences separated by pauses or segments of sentences separated by pauses. In some models used in ASR, a part of a word sound, or a phone, can be used as the modeling unit to match the sound to a word. Recognition may increase by considering the context (neighbors) of the phone together with the phone, thus forming a diphone or triphone. Triphones are usually modeled using a three-state Hidden Markov Model (HMM). Similar states can be grouped together and shared across different triphones. These shared states, often called senones, are the main modeling units in ASR.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An example provides a system that includes a memory and a processor to process mixed speech audio received from a microphone. The system may separate the mixed speech audio using permutation invariant training, wherein a criterion of the permutation invariant training is an utterance of the mixed speech audio. The system may also generate a plurality of separated streams for submission to a speech decoder.

An example provides a method for multi-talker speech separation that includes processing mixed speech audio received from a microphone. The method may also include separating the mixed speech audio using permutation invariant training, wherein a criterion of the permutation invariant training is an utterance of the mixed speech audio. The method may also include generating a plurality of separated streams for submission to a speech decoder.

Another example provides a tangible, computer-readable medium comprising instructions that, when executed by a processor, process mixed speech audio received from a microphone. The instructions may also instruct the processor to separate the mixed speech audio using permutation invariant training, wherein a criterion of the permutation invariant training is an utterance of the mixed speech audio. The instructions may also instruct the processor to generate a plurality of separated streams for submission to a speech decoder.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one example, the various components may reflect the use of corresponding components in an actual implementation. In other examples, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include implementations of computer-readable media generally, such as signals per se. Therefore, in contrast, computer-readable media generally (i.e., not computer-readable storage media) may additionally include communication media such as transmission media for wireless signals and the like.

Figure 1:
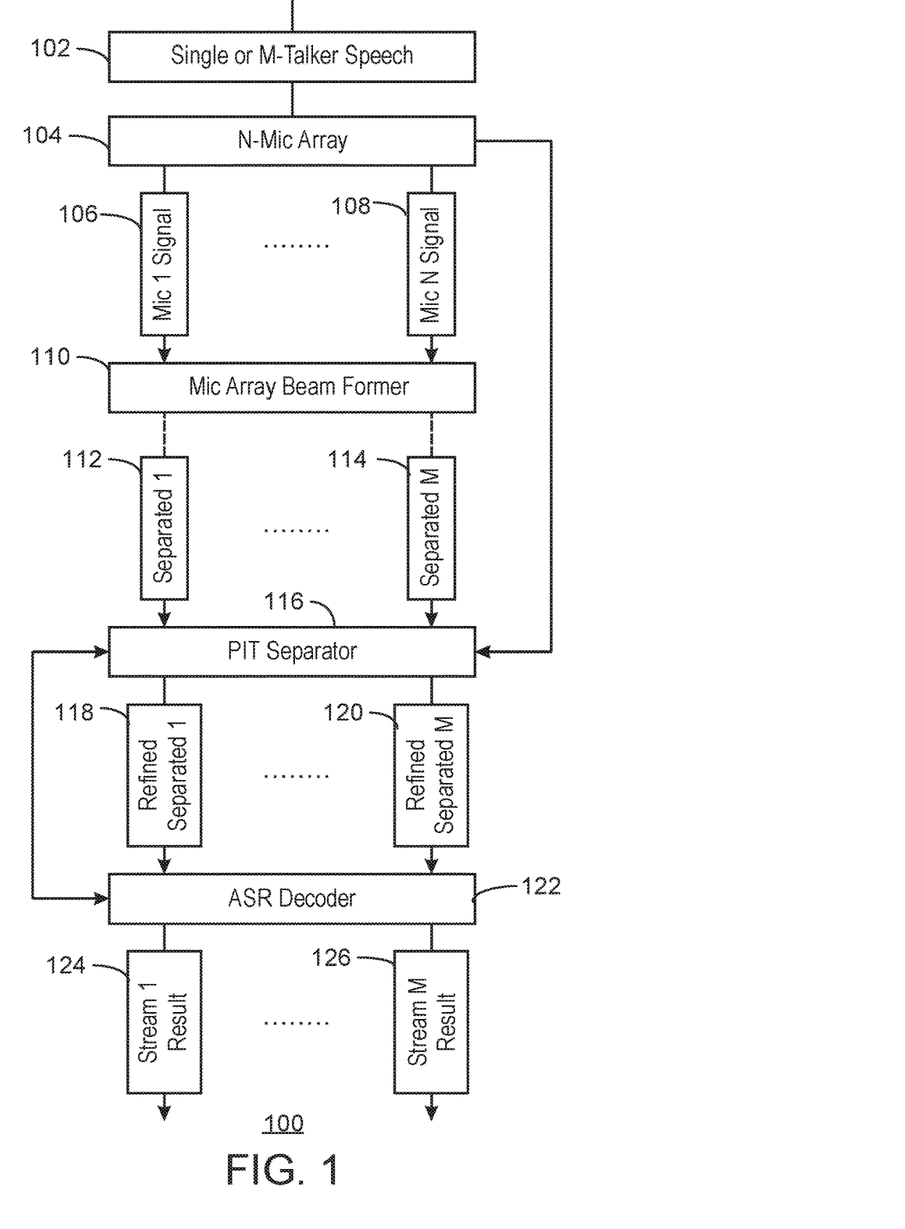
FIG. 1 is a block diagram of an example of a multi-talker speech separation and recognition architecture.

FIG. 1 is a block diagram of an example of a multi-talker speech separating and recognition architecture 100. FIG. 1 shows a general outline to support multi-talker mixed speech recognition, adaptation, and diarization. While the blocks shown in FIG. 1 may be located in a single device, the shown blocks may be remote from each other.

Speech 102 can include a single talker or multiple talkers. The number of speakers can be one, two, three, and up to M speakers. Speech recognition functions from one speaker or direction, but the multi-talker speech separator and recognizer can simultaneously recognize multiple streams of speech in response to detecting multiple talkers speak at the same time by using multi-channel information and multi-stream parallel decoding. The speech 102 can be detected at a microphone array 104. The microphone array 104 includes 1, 2, 3 . . . n number of microphones in the microphone array 104 where the input received at each microphone may be considered a separate channel and referred to collectively as multi-channel mixed speech audio.

A signal of speech 102 is detected at a microphone array 104. The microphone array 104 may include a mic 1 signal 106 and any other microphone signals, up to a microphone n signal 108 corresponding to n number of microphones. The microphone 1 signal and the microphone n signal can be sent to a microphone array beam former 110. As used herein, a beam former 110 may be used when multi-channel information is available and may act as a filtering technique. In an example, beamforming may be performed using at least one of deep learning based and signal processing techniques to separate the mixed speech into multiple streams. In response to being fed through a beam former 110, output signals include a separated signal 1 at 112 through separated signal M at 114. As shown in FIG. 1, use of beam former 110 may be skipped by a microphone array 104.

In an example, the speech 102 signal travels from the microphone array 104 to the permutation invariant training separator 116. In some examples, the techniques discussed herein employ permutation invariant training ("PIT") of deep learning models for speech separation that functions for independent talkers in a multi-talker signal. Techniques using PIT and discussed herein optimize a deep learning model for the separation regression error, ignoring the order of mixing sources, in some examples. There may be a number of permutations of possible matches between an output of a neural network and the appropriate signal source. For example, where S is a number of the signal sources, there may be S! possible permutations of possible matches between an output of a neural network and the appropriate signal source.

In some examples, the techniques discussed herein can first determine an output-target assignment and then minimize the deviation (e.g., error) of the output-target assignment (where "output" refers to a deep learning model's output for an attempt to isolate a particular source signal for a particular "target" source). In some examples, these techniques can be implemented into a neural network's structure itself, solving the label permutation problem that prevented making progress on deep learning based techniques for speech separation. In some examples, the techniques discussed herein can also include source (e.g., talker, noise, etc.) tracing that works together with the PIT deep learning model discussed herein to trace streams originating from a same source through the frames of a mixed signal. In some examples, the disclosed techniques may therefore provide permutation invariant training in that they consider and compensate for variations of which signal source is properly attributable for which output of the neural network.

The general terms "deep learning models", "model", and "neural networks" are used interchangeably herein. Moreover, although this description uses terms "deep learning models", "model", and "neural networks," it is contemplated that the techniques discussed herein can be used for deep learning models, generative models, classifiers, or any other appropriate machine learning techniques.

The use of the PIT separator 116 addresses the speaker independent multi-talker speech separation and tracing problem. PIT functions to separate speech 102 to address, in part, the multi-talker speech problem. The PIT separator 116 focuses on separating multiple-talkers rather than using a multi-class regression to attempt to provide given labels for each output layer, segmentation, or clustering. PIT and the PIT separator 116 can determine the best output-label assignment automatically and minimizes the error given the assignment. The PIT separator 116 may not use a separate clustering step to trace speech streams during evaluation, instead integrating speaker tracing in the PIT framework directly so that separation and tracing can be carried out without processing iterations. In an example, separate iterative steps for clustering and tracing of speech can be avoided by using the PIT separator 116 to instruct separated frames belonging to the same speaker to be aligned to the same output layer during training time. In an example, the alignment to the same output layer during training time may be done with recurrent neural networks ("RNNs"). In an example of using a PIT separator 116, the time and processing cost associated with label assignment is small compared to the RNN computation during training, and is zero during evaluation. In other words, through the training process PIT may learn acoustic cues for source separation, which are speaker and language independent, similar to humans.

Different streams may be output by the PIT separator 116 including a refined separated stream 1 118 corresponding to a first talker, and any number of additional refined separated streams including a refined separated stream m 120 corresponding to an m talker, wherein m represents a number of detected talkers. These refined separated streams may be passed then to an ASR decoder 122.

The ASR decoder 122 may be separately applied to each stream. As used herein, the streams separated by the PIT separator 116 may be feature streams, speech streams, or other suitable stream of audio data. Once streams have been separated by a PIT separator 116, decoders can operate independently to recognize speech. The output of an ASR decoder can be held in the transcription of a stream 1 result 124 and a stream m result 126. The ASR decoder 122 may also, prior to decoding, request the PIT separator 116 to further separate speech into multiple streams of senone posterior probabilities upon which conventional decoders can operate to recognize speech. In an example, the separation of speech into multiple streams may be done using a cross entropy objective function. A cross entropy objective function can refer to a function following a Monte Carlo approach to combinatorial and continuous multi-extremal optimization and importance sampling. A cross entropy objective function can include generating a random data sample and then updating the parameters of the random mechanism based on the data to produce a sample in each successive iteration to limit cross-entropy or Kullback-Leibler divergence.

A PIT separator 116 can further exploit high level information, such as language model information, from the multi-stream decoders. The high level information aids to predict future which can help speech separation and tracing. The decoders on multiple streams can operate jointly to decide the best decoding result. Speaker tracing can be further invoked with speaker identification techniques to provide tags to each speech stream. As used herein, providing tags to each speech stream may also be referred to as diarization. In an example, separation components and acoustic models can be adapted using supervised and unsupervised techniques with decoding results from multiple streams. As used herein, supervised techniques refer to techniques that include reference to a true transcript of the separated streams while an unsupervised technique refers to a reference that assume the decoded language is the true transcript. As used herein, a true transcript is a transcript that has been verified by a verified or input by an authorized user. Verification of an audio input can include the review of a transcript by a user compared to audible playback of the recording. A true transcript that is input by an authorized user can include a user that performs a first pass of transcripting while listening to the audio playback of a recording being transcripted. Further, the acoustic model referenced above may represent the relationship between an audio signal and the phonemes or other linguistic units that make up speech described herein. The acoustic model is learned from a set of audio recordings and their corresponding transcripts. Training an acoustic model can include taking audio recordings of speech, text transcriptions, and using software to create statistical representations of the sounds that make up each word.

In examples, monaural speech separation can estimate the individual source signals in a linearly mixed single-microphone signal. The source signals may be reverberated. In an example, reverberated may refer to a process where underlying clean signals are filtered before observed in the mixture. Reverberated source signal conditions may be recovered using the presently disclosed techniques. In an example, separation methods that vary from the one described may be carried out in the frequency domain, in which the task can be cast as recovering the short-time Fourier transformation ("STFT") of the source signals.

Once the STFT of each source signal is estimated, the inverse can be used to compute the time-domain signal in each frame, and an overlap-add operation can be exploited to reconstruct the original signal. Perfect reconstruction can be achieved by choosing the correct analysis and synthesis window pairs. The STFT magnitude spectra can be estimated from the mixture during the separation process. The phase of the mixed speech is used directly when recovering the time domain waveforms of the sources. This is because phase prediction may be intensive in the speech separation setup. Previous systems may have learned from some training set to look for regularities. These sets may have relied on a deep learning model to estimate the magnitude spectra of each source.

Results may also be achieved if, estimates are made for a set of masks using a deep learning model and reconstructing the magnitude spectra. Since masks are to be estimated as an intermediate step when estimating magnitude spectra of source signals, as this may affect the adoption of the correct masks and effective training objectives. In the present disclosure, masks are extended for separating single-talker speech from noises to multi-talker speech separation tasks. Selection of a mask can include a metric for the ideal ratio mask ("IRM") for each source. Optimizing IRM can also encourage improved signal to distortion ratio ("SDR") when the sources have the same phase.

The ideal amplitude mask ("IAM") can be used for each source to construct the exact source signals given the magnitude spectra of the mixed speech. In an example, if the phase of each source equals to the phase of the mixed speech that can achieve improved SDR. IRM and IAM do not consider phase differences between source signals and the mixture. The phase sensitive mask ("PSM"), takes phase difference into consideration.

Masks can be first estimated, and through this estimation, the magnitude of each source spectrum can then be estimated, and the model parameters can be optimized to minimize the mean square error ("MSE") between the estimated mask and one of the target masks defined above.

A smaller error on masks may not lead to a smaller reconstruction error. To overcome this concern, minimizing the mean squared error MSE between the estimated magnitude and the true magnitude can minimize reconstruction error. The accuracy of mask estimation may not affect the training criterion for those sounded segments. Using phase sensitive masks may avoid disruption as though replacing the original training targets with the phase discounted targets.

Figure 2:
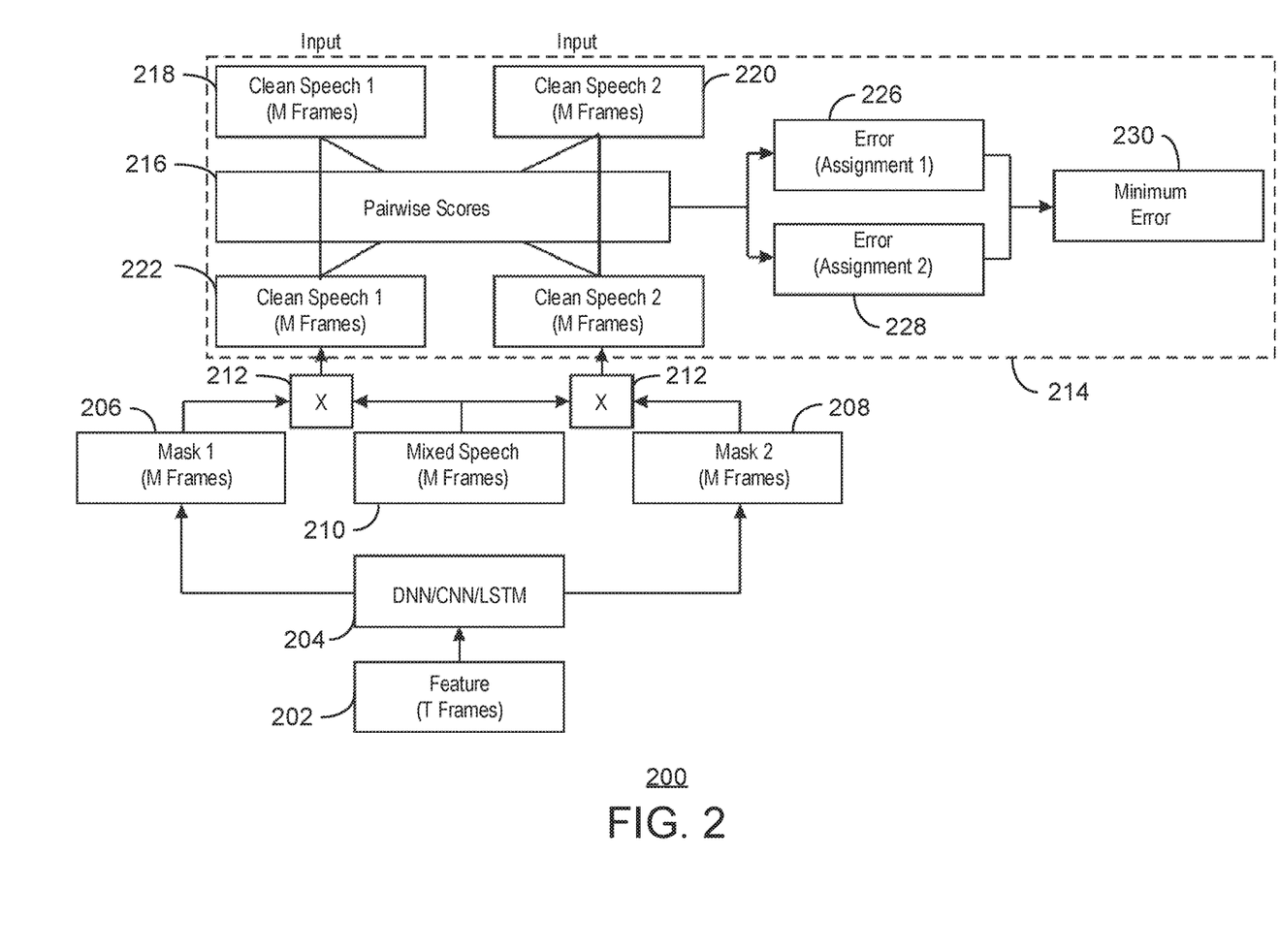
FIG. 2 is a block diagram of an example two-talker speech separation and recognition model with permutation invariant training.

FIG. 2 is a block diagram of an example two-talker speech separator model 200 with permutation invariant training. While FIG. 2 shows one separator model, other variations of the model are possible as described herein.

Speech separation previously treated the separation problem as a multi-class regression problem. A number of frames of feature vectors 202 of the mixed signal may have been used as the input to some deep learning models 204, such as deep neural networks ("DNNs"), convolutional neural networks ("CNNs"), and long short-term memory ("LSTM"), and recurrent neural networks ("RNNs") to generate one frame of masks for each talker. A mask 1 206 and a mask 2 208 can be generated for each talker to include up to M number of frames, where M corresponds to the number of frames identified as belonging to that speaker. The masks can be used to construct one frame of single-source speech for sources 1 and 2, respectively. In training, the correct reference or target magnitude must be provided to the corresponding output layers for supervision. A model can have multiple output layers, at least one for each mixing source, and these output layers correspond to the same input mixture. Due to the correspondence to input source mixture, reference assigning can be tricky especially if the training set contains many utterances spoken by many speakers. This problem is referred to as the label ambiguity problem or permutation problem. In part due to this problem, previous solutions performed poorly with speaker independent multi-talker speech separation.

With multi-talker scenarios, given only the magnitude of the mixed audio spectrum $|Y(t, f)|$, the recovering a short term Fourier transformation of the source signal spectra $|X_S(t, f)|$ for decoding the speech can be computationally complex because there are an infinite number of possible

|X_S(t, f)| combinations that lead to the same |Y(t, f)|. In an example using the present techniques, a system can learn from a training set, S, that contains pairs of |Y(t, f)| and |X_S(t, f)| to look for regularities. More specifically, in the examples described below, a deep learning model g(•) is defined such that $g(v(Y), \Phi)=|\hat{X}_S|, s=1, \ldots, S$, where $\Phi$ are the model parameters and where v(Y) is some feature representation of the spectra Y, which can be but not necessary equals to the magnitude spectra |Y|.

Instead of using these features to estimate |X_S(t, f)| directly, the presently disclosed technique uses, in an example, a first estimate a set of masks $\hat{M}_S(t, f)$ using a deep learning model and reconstruct the magnitude spectra. The use of masks allow the estimation to be constrained as masks may be invariant to input variabilities caused by energy difference.

In FIG. 2, the label permutation problem is illustrated and the core solution proposed is applying permutation invariant training ("PIT"). In the model depicted in FIG. 2, the reference source streams are given as a mixed speech set 210 instead of an ordered list. The mixed speech set can be sent together with the masks of source streams as a combined input 212.

In an example, the same training result is obtained, no matter in which order these sources are listed. This behavior is achieved with PIT highlighted inside the dashed rectangular indicating a PIT action area 214 in FIG. 2. In order to associate references to the output layers, a first computation is made comparing the pairwise MSE scores 216 between each reference, e.g. cleaned speech 1 218 and cleaned speech 2 220 and the estimated source, e.g. clean speech 1 222 and clean speech 2 224. A determination is made for the possible assignments between the references and the estimated sources, and compute the total MSE for each assignment, e.g. error assignment 1 226 and error assignment 2 228. The assignment with the least MSE can be compared and chosen based on the assignment with a minimum error 230.

The assignment model with this selection can be further optimized to reduce this least MSE. In other words the present technique allows for simultaneous label assignment and error evaluation. In an example this technique can use as input T successive frames, e.g., an input meta-frame, of features to exploit contextual information. In an example, the output of the PIT can be also a window of frames. With PIT, the separation error can be directly minimized at the meta-frame level. During evaluation, the only information available can be mixed speech. Speech separation can be directly carried out for each input meta-frame, for which an output meta-frame with M frames of speech is estimated for each stream. The input meta-frame, and thus the output meta-frame, is then shifted by one or more frames. Due to the PIT training criterion, output-to-speaker assignment can stay the same for frames inside the same output meta-frame but may change across output meta-frames. Speaker-tracing algorithms may additionally be applied to improve performance as discussed, in part, in FIG. 3.

Figure 3:
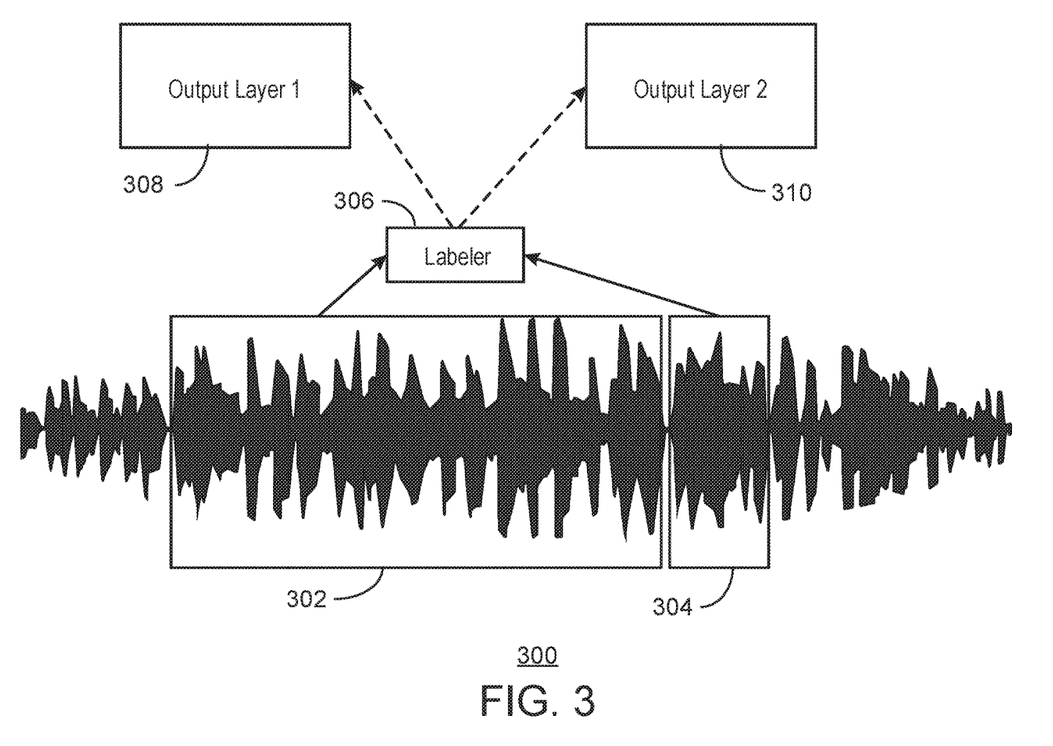
FIG. 3 is a schematic of an example separation and tracing outline.

FIG. 3 is a schematic of an example separation and tracing outline 300. As used herein, tracing may refer to speaker tracing that invokes speaker identification techniques to provide tags to each speech stream in an output layer.

To trace the source streams, overlapping frames can be used in adjacent output meta-frames, to determine whether assignment has been switched or not by comparing MSEs of different permutations measured on the overlapping frames of adjacent output meta-frames. However, this approach involves a separate tracing step which may complicate the model. Further, this approach is at risk in the case of an incorrect assignment. For example, one incorrect assignment at an earlier frame would switch the assignment for the frames after that incorrect frame, as the assignment for later frames depends on that for earlier frames.

In the present disclosure, the tracing problem is addressed through the integration of speech separation and tracing using the PIT framework discussed above. If speech streams could be correctly traced, then the frames from the same speaker would be aligned to the same output layer.

FIG. 3, shows a simple case where there may be two utterances, utterance 1 302 and utterance 2 304 that will be separated and labeled at a labeler 306. The outputs may be labeled as either output layer 1 308 or output layer 2 310.

The example shown can be a two-talker mixed speech case. For example, if frame 1 of the speaker 1's speech is aligned to output 1 then the rest of the frames of this speaker may also be aligned to output 1. Based on the assignment of speech frames to an output, the system can trace the speech streams if speech frames from the same speaker are assigned to the same output layer during training. The PIT framework with following changes can assign frames by speaker based on the criterion of assigning an entire utterance, when possible. In an example of the present technique, an entire utterance can be used instead of a T (M)-frame segment, as the input and output to the deep learning model during training. In the presently disclosed tracing integrated model, the label-output assignment decision is made on the whole utterance. The pair-wise MSE scores 216 can be computed on the whole utterance. In an example, the pairwise scoring can be computed when the frames from the same output layer belong to the same speaker.

In the present techniques, utterances can have variable length, accordingly, the tracing performed uses long-range dependency and models other than DNN and CNN. In an example, one model can be a recurrent neural networks (RNNs) such as deep LSTMs and bidirectional long short term memory ("BLSTMs") used to learn the masks. In an example with deep LSTMs, the utterance may be evaluated frame-by-frame exploiting the past or future history information at each layer. When BLSTMs are used, the information from the past and future, as in across the utterance, is stacked at each layer and used as the input to the next layer for better decisions at higher layers. With PIT performing tracing, the model learns to separate and trace speech streams at the same time. During separation, it may be unnecessary to conduct pairwise MSEs and find errors of each possible permutation. The frames from the same output layer are treated as though they are from the same speaker. The separation and tracing accuracy can be further improved with a 2-stage or stacking system, in which the first stage's separation results are used to inform the second-stage model to make better decision. The input to the second stage includes the mixed speech and the separated speech streams from the first stage. In addition, the final mask is the average of that from the first stage using only mixed speech as the input and that from the second stage that uses augmented features as the input.

In one example, the two stage system for improving separation and tracing can be formalized in the following set of equations.

$$\hat{M}_S^{(1)} = LSTM^{(1)}(|Y|)$$

$$\hat{M}_S^{(2)} = LSTM^{(2)}(|Y|, \hat{M}_S^{(1)} \cdot |Y|)$$

$$\hat{M}_S = \frac{\hat{M}_S^{(1)} + \hat{M}_S^{(2)}}{2}$$

In these example equations, $\hat{M}_S^{(1)}$ and $\hat{M}_S^{(2)}$ refer to estimated masks for use in the first and second stage of the above described separation and tracing steps. Specifically, the example equation for $\hat{M}_S^{(1)}$ refers to the generation of a first mask applying a first LSTM to the magnitude of the mixed spectrum in question (|Y|). The example equation for $\hat{M}_S^{(2)}$ refers to the generation of a second mask applying a second LSTM to the magnitude of the mixed spectrum in question (|Y|) as well as the element-wise product of the first mask results and the magnitude of the mixed spectrum in question (|Y|).

An example of the present techniques may also enable multi-stream recognition and diarization of mixed speech audio. These discussed techniques, as well as the techniques discussed above and below, support single channel and multichannel audio. In a first model structure, referred to as the direct model, PIT-T can be applied directly with each output layer representing the senone probabilities from one speaker. In an example, the separation training criteria can be replaced, such as ideal amplitude mask ("IAM"), phase sensitive mask ("PSM") and nonnegative PSM ("NPSM"), with ASR criteria. In an example, ASR criteria includes the cross-entropy (CE) and sequence discriminative training criteria between the estimated probabilities of each stream and the senone labels. In a direct model, the speech separation model and acoustic model are combined into one. In an example, another model, called cascading model, can be used, where the mixed speech is first separated into multiple streams of speech features using PIT-T.

Each stream can be recognized using a conventional single-stream AM. The single-stream AM used can be the same for the streams or different for the streams, such as a speaker dependent AM. Although the training of the PIT-T separation component and the AMs can be optimized independently, the recognition accuracy can be further improved if these two components are later jointly optimized. When multi-channel information is available, the spatial filtering techniques such as beamforming can be exploited to separate the mixed speech into multiple streams. These separated speech streams along with the raw signals from the channels can be used as the input to the PIT-T based separation component. High level information such as a language model is also useful to trace the speaker. As used herein, a language model can refer to a probability distribution over sequences of words. Given such a sequence, the language model may assign a probability to the sequence. In an example of the present techniques, a system may use the language model to match sounds with word sequences. In an example, the language model can provide context to distinguish between words and phrases that sound similar.

More than one stream can be received by the decoder and can be fed back to the separation component as part of information to trace speech streams. Information can be exploited and may include the speaker recognition result, which can be used to assist speaker tracing and diarization. If the system targets separating a speaker from other speakers, the acoustic model can be altered and adapted for that specific speaker along with the separation model end-to-end. If the system targets at mixed speech of two or three specific speakers, then the components can be jointly adapted for these target speakers.

Figure 4:
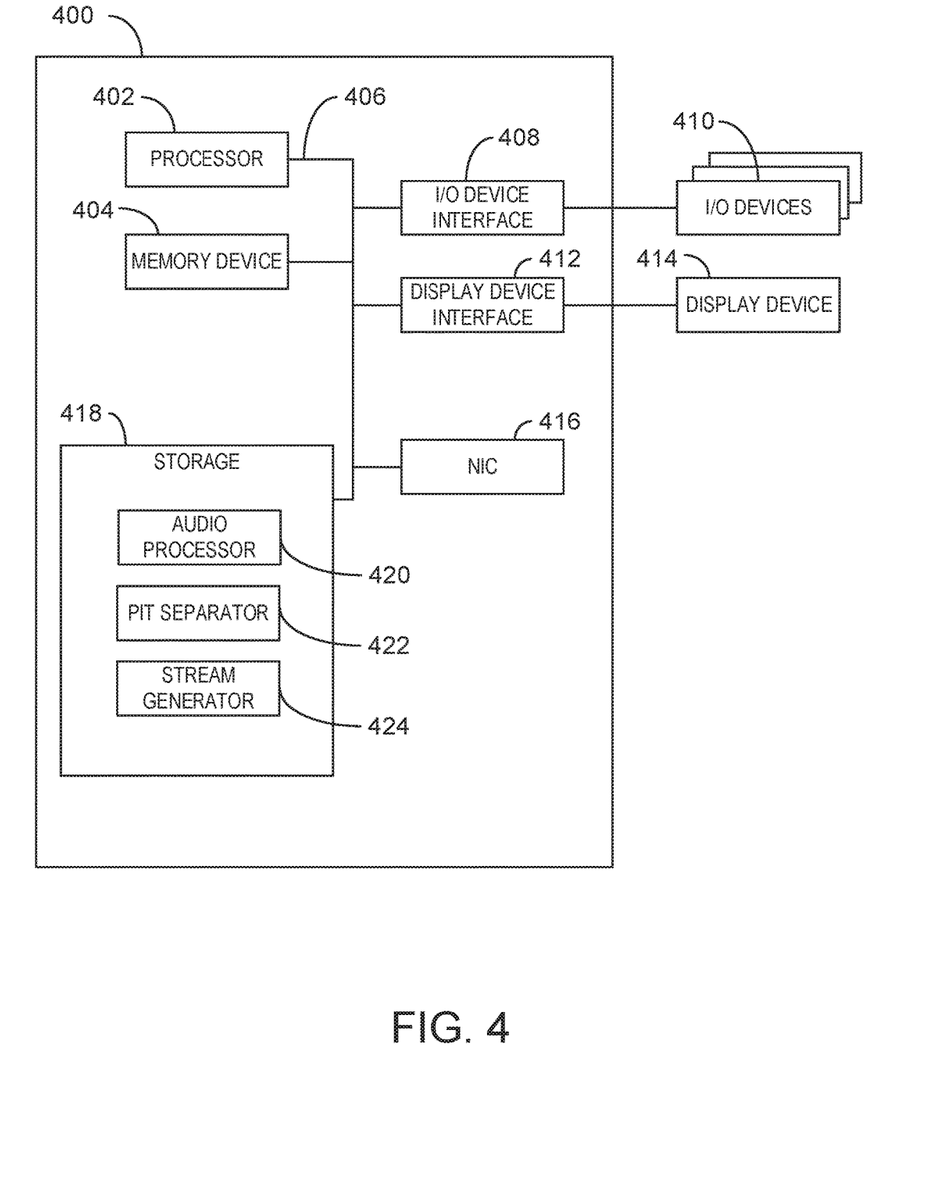
FIG. 4 is a block diagram of an example of a computing system for multi-talker speech separation and recognition.

FIG. 4 is a block diagram of an example of a computing system for multi-talker speech separation. The computing system 400 may be, for example, a mobile phone, laptop computer, desktop computer, or tablet computer, among others. The computing system 400 may include a processor 402 that is adapted to execute stored instructions, as well as a memory device 404 that stores instructions that are executable by the processor 402. The processor 402 can be a single core processor, a multi-core processor, a computing cluster, or any number of other configurations. The memory device 404 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 402 may be connected through a system bus 406 (e.g., PCI, ISA, PCI-Express, NuBus, etc.) to an input/output (I/O) device interface 408 adapted to connect the computing system 400 to one or more I/O devices 410. The I/O devices 410 may include, for example, a keyboard, a gesture recognition input device, a voice recognition device, and a pointing device, wherein the pointing device may include a touchpad or a touchscreen, among others. The I/O devices 410 may be built-in components of the computing system 400, or may be devices that are externally connected to the computing system 400.

The processor 402 may also be linked through the system bus 406 to a display device interface 412 adapted to connect the computing system 400 to a display device 414. The display device 414 may include a display screen that is a built-in component of the computing system 400. The display device 414 may also include a computer monitor, television, or projector, among others, that is externally connected to the computing system 400. A network interface card (NIC) 416 may also be adapted to connect the computing system 400 through the system bus 406 to a network (not depicted).

The storage 418 can include a hard drive, an optical drive, a USB flash drive, an array of drives, cloud storage, network area storage, or any other suitable storing means or combinations thereof. The storage 418 may include an audio processor 420, a PIT separator 422, and a stream generator 424.

The audio processor 420 can process mixed speech audio received from a microphone. The system can include a microphone array as a microphone and the mixed speech audio is multi-channel mixed speech audio.

The PIT separator 422 can separate the mixed speech audio using permutation invariant training, wherein a criterion of the permutation invariant training is an utterance of the mixed speech audio. The permutation invariant training may apply a language model of prediction to separating the mixed speech audio. The permutation invariant may apply an acoustic model of prediction to separating the mixed speech audio. These two models may be used at the same time and in conjunction with each other.

The stream generator 424 can generate a plurality of separated streams for submission to a speech decoder. In an example, the plurality of separated streams comprises a first separated speech stream and a second separated speech stream. The speech decoder decodes the speech of the first separated speech stream and the second separated speech stream, independently. The plurality of separated streams comprises senone posterior probabilities. Further, the senone posterior probabilities are trained using a cross entropy objective function.

In an example system, the processor may trace the mixed speech audio using permutation invariant training to provide tags to each speech stream indicating speaker identity. In another example, the processor may apply a beam former to separate the mixed speech audio into different directional streams based on a direction of the mixed speech audio compared to a direction of the beam former. In an example system, wherein the processor is to adapt a separation of the mixed speech audio by the permutation invariant training based on supervision of a true transcript.

It is to be understood that the block diagram of FIG. 4 is not intended to indicate that the computing system 400 is to include the components shown in FIG. 4. The computing system 400 can include fewer or additional components not illustrated in FIG. 4 (e.g., additional applications, additional modules, additional memory devices, additional network interfaces, etc.). Furthermore, any of the functionalities of the audio processor 420, PIT separator 422, and stream generator 424 may be partially, or entirely, implemented in hardware and/or in the processor 402. For example, the functionality may be implemented with an application specific integrated circuit, in logic implemented in the processor 402, or in any other device.

Figure 5:
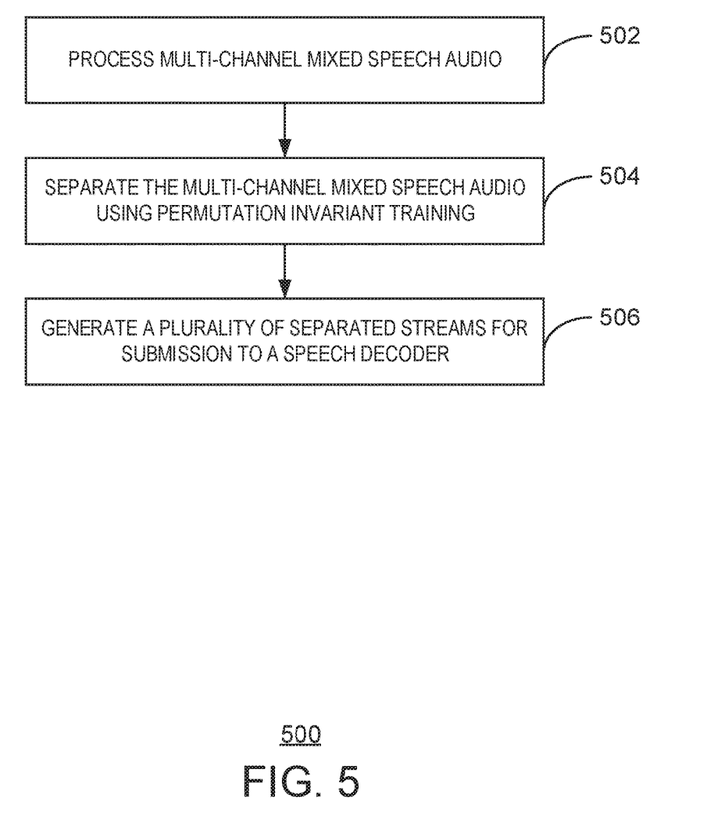
FIG. 5 is a process flow diagram of an example process for multi-talker speech separation and recognition.

FIG. 5 is a process flow diagram of an example process for multi-talker speech separation and recognition. The elements of the method shown here are presented in an example order, however, other orders of this method can also function, for example, switching order of blocks 502 and 504. The method 500 can be implemented with any suitable computing device, such as the computing system 400 of FIG. 4.

At block 502, the method 500 includes processing mixed speech audio received from a microphone. In some examples, the microphone can be included in a microphone array in a system and the mixed speech audio can be multi-channel mixed speech audio.

At block 504, the method 500 includes separating the mixed speech audio using permutation invariant training, wherein a criterion of the permutation invariant training is defined on the utterance of the mixed speech audio. The permutation invariant training may apply a language model of prediction to separating the mixed speech audio. The permutation invariant training may apply an acoustic model of prediction to separating the mixed speech audio. These two models may be used at the same time and in conjunction with each other.

At block 506, the method 500 includes generating a plurality of separated streams for submission to a speech decoder. In an example, the plurality of separated streams comprises a first separated speech stream and a second separated speech stream. The speech decoder decodes the speech of the first separated speech stream and the second separated speech stream. The plurality of separated streams comprises senone posterior probabilities. Further, the senone posterior probabilities are trained using a cross entropy objective function.

In one example, the process flow diagram of FIG. 5 is intended to indicate that the steps of the method 500 are to be executed in a particular order. Alternatively, in other examples, the steps of the method 500 can be executed in any suitable order and any suitable number of the steps of the method 500 can be included.

Figure 6:
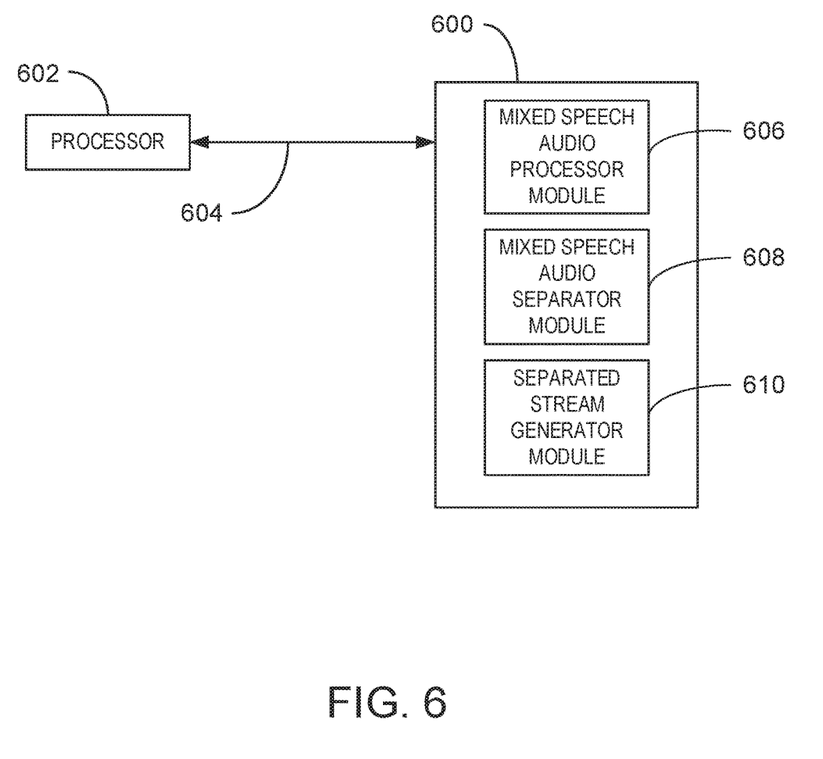
FIG. 6 is block diagram of an example computer-readable storage media for multi-talker speech separation and recognition.

FIG. 6 is block diagram of an example computer-readable storage media for multi-talker speech separation. The tangible, computer-readable storage media 600 may be accessed by a processor 602 over a computer bus 604. Furthermore, the tangible, computer-readable storage media 600 may include code to direct the processor 602 to perform the steps of method 500.

The various software components discussed herein may be stored on the tangible, computer-readable storage media 600, as indicated in FIG. 6. For example, the tangible computer-readable storage media 600 can include a mixed speech audio processor module 606 to process mixed speech audio received from a microphone. The system can include a microphone array as a microphone and the mixed speech audio is multi-channel mixed speech audio.

The tangible computer-readable storage media 600 can include a mixed speech audio separator module 608 to separate the mixed speech audio using permutation invariant training, wherein a criterion of the permutation invariant training is an utterance of the mixed speech audio. The permutation invariant training may apply a language model of prediction to separating the mixed speech audio. The permutation invariant may apply an acoustic model of prediction to separating the mixed speech audio. These two models may be used at the same time and in conjunction with each other.

The tangible computer-readable storage media 600 may also include a separated stream generator module 610 to generate a plurality of separated streams for submission to a speech decoder. In an example, the plurality of separated streams comprises a first separated speech stream and a second separated speech stream. The speech decoder decodes the speech of the first separated speech stream and the second separated speech stream independently. The plurality of separated streams comprises senone posterior probabilities. Further, the senone posterior probabilities are trained using a cross entropy objective function.

It is to be understood that any number of additional software components not shown in FIG. 6 may be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. The specific structural features and methods described above are disclosed as example forms of implementing the claims.

EXAMPLES

Example 1

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a system for multi-talker speech separation and recognition, including a memory and a processor. The example system can process mixed speech audio received from a microphone. The example system also include techniques to separate the mixed speech audio using permutation invariant training, where a criterion of the permutation invariant training is an utterance of the mixed speech audio. The system also includes techniques to generate a plurality of separated streams for submission to a speech decoder. Other examples of this aspect include corresponding computer systems, apparatus, and computer programs recorded on one or more computer storage devices, each configured to perform the actions of the methods.

Implementations may include one or more of the following features. The system where the plurality of separated streams includes a first separated speech stream and a second separated speech stream, and the processor is to decode with the speech decoder the speech of the first separated speech stream based on the first separated speech stream and the second separated speech stream. The system where the processor is to trace the mixed speech audio using permutation invariant training to provide tags to each speech stream indicating a speaker identity. The system where the permutation invariant training applies a language model of prediction to separating the mixed speech audio. The system where the permutation invariant training applies an acoustic model of prediction to separating the mixed speech audio. The system where the microphone is a microphone array, and the mixed speech audio is multi-channel mixed speech audio. The system where the processor is to apply a beam former to separate the mixed speech audio into different directional streams based on a direction of the mixed speech audio compared to a direction of the beam former. The system where the processor is to adapt a separation of the mixed speech audio by the permutation invariant training based on supervision of a true transcript. The system where the plurality of separated streams includes senone posterior probabilities. The system where the senone posterior probabilities are optimized using a cross entropy objective function.

Example 2

Another example includes a method for multi-talker speech separation and recognition, including processing mixed speech audio received from a microphone, separating the mixed speech audio using permutation invariant training, where a criterion of the permutation invariant training is defined on the utterance of the mixed speech audio, and generating a plurality of separated streams for submission to a speech decoder. Other examples of this aspect include corresponding computer systems, apparatus, and computer programs recorded on one or more computer storage devices, each configured to perform the actions of the methods.

Implementations may include one or more of the following features. The method where the plurality of separated streams includes a first separated speech stream and a second separated speech stream, and including decoding with the speech decoder the speech of the first separated speech stream based on the first separated speech stream and the second separated speech stream. The method including tracing the mixed speech audio using permutation invariant training to provide tags to each speech stream indicating a speaker identity. The method where the permutation invariant training applies a language model of prediction to separating the mixed speech audio.

Example 3

An example includes a tangible computer-readable storage media including instructions that, in response to an execution by a processor process mixed speech audio received from a microphone, separate the mixed speech audio using permutation invariant training, where a criterion of the permutation invariant training is defined on the utterance of the mixed speech audio, and generate a plurality of separated streams for submission to a speech decoder. Other examples of this aspect include corresponding computer systems, apparatus, and computer programs recorded on one or more computer storage devices, each configured to perform the actions of the methods.

Implementations may include one or more of the following features. The computer-readable storage media where: the plurality of separated streams includes a first separated speech stream and a second separated speech stream; and where the instructions instruct a processor to decode with the speech decoder the speech of the first separated speech stream based on the first separated speech stream and the second separated speech stream. The computer-readable storage media where the instructions, in response to execution on a processor, trace the mixed speech audio using permutation invariant training to provide tags to each speech stream indicating a speaker identity. The computer-readable storage media where the permutation invariant training applies a language model of prediction to separating the mixed speech audio. The computer-readable storage media where the permutation invariant training applies an acoustic model of prediction to separating the mixed speech audio. The computer-readable storage media where the instructions, in response to execution on the processor, apply a beam former to separate the mixed speech audio into different directional streams based on a direction of the mixed speech audio compared to a direction of the beam former. Implementations of the described techniques may include hardware, a method or process, or computer software on a computer-accessible medium.

What is claimed is:

1. A system for multi-talker speech separation and recognition, comprising:
   a processor; and
   a memory device coupled to the processor, the memory device to store instructions that, when executed by the processor, cause the processor to:
      process a mixed speech audio received from a microphone;
      use permutation invariant training (PIT) to separate and trace speech streams in the mixed speech audio, wherein the PIT includes:
         estimate, in a first stage, a first mask by applying a first deep learning model to the mixed speech audio; and
         estimate, in a second stage, a second mask by applying a second deep learning model to the first estimated mask and the mixed speech audio;
      generate a plurality of separated speech streams from the mixed speech audio for submission to a speech decoder, wherein the plurality of separated speech streams are generated based on the first estimated mask and the second estimated mask; and
      decode, using the speech decoder, speech of a first separated speech stream of the plurality of separated speech streams.

2. The system of claim 1, wherein:
   the plurality of separated speech streams comprises the first separated speech stream and a second separated speech stream; and
   the processor is to decode with the speech decoder the speech of the first separated speech stream based on the first separated speech stream and the second separated speech stream.

3. The system of claim 1, wherein the processor is to trace the mixed speech audio using permutation invariant training to provide tags to a speech stream indicating a speaker identity.

4. The system of claim 1, wherein the permutation invariant training applies a language model of prediction to separating the mixed speech audio.

5. The system of claim 1, wherein the permutation invariant training applies an acoustic model of prediction to separating the mixed speech audio.

6. The system of claim 1, wherein:
the microphone is a microphone array; and
the mixed speech audio is multi-channel mixed speech audio.

7. The system of claim 1, wherein the processor is to apply a beam former to separate the mixed speech audio into different directional streams based on a direction of the mixed speech audio compared to a direction of the beam former.

8. The system of claim 1, wherein the processor is to adapt the separation of the mixed speech audio by the permutation invariant training based on supervision of a true transcript.

9. The system of claim 1, wherein the plurality of separated speech streams comprises senone posterior probabilities.

10. The system of claim 9, wherein the senone posterior probabilities are optimized using a cross entropy objective function.

11. The system of claim 1, wherein the permutation invariant training applies a model that separates and traces speech streams at the same time, where the separation and tracing uses a stacking system in which a first stage separation result is used to inform a second stage model that includes the mixed speech and the separated speech streams from the first stage.

12. A method for multi-talker speech separation and recognition, comprising:
processing a mixed speech audio received from a microphone;
using permutation invariant training (PIT) to separate and trace speech streams in the mixed speech audio, wherein the PIT includes:
estimate, in a first stage, a first mask by applying a first deep learning model to the mixed speech audio; and
estimate, in a second stage, a second mask by applying a second deep learning model to the first estimated mask and the mixed speech audio;
generating a plurality of separated speech streams from the mixed speech audio for submission to a speech decoder, wherein the plurality of separated speech streams are generated based on the first estimated mask and the second estimated mask; and
decoding, using the speech decoder, speech of a first separated speech stream of the plurality of separated speech streams.

13. The method of claim 12, comprising:
separating the mixed speech audio into the first separated speech stream and a second separated speech stream; and
decoding with the speech decoder the speech of the first separated speech stream based on the first separated speech stream and the second separated speech stream.

14. The method of claim 12, comprising tracing the mixed speech audio using permutation invariant training to provide tags to a speech stream indicating a speaker identity.

15. The method of claim 12, wherein the permutation invariant training applies a language model of prediction to separating the mixed speech audio.

16. The method of claim 12, wherein the permutation invariant training applies an acoustic model of prediction to separating the mixed speech audio.

17. The method of claim 12, wherein:
the microphone is a microphone array; and
the mixed speech audio is multi-channel mixed speech audio.

18. The method of claim 12, comprising applying a beam former to separate the mixed speech audio into different directional streams based on a direction of the mixed speech audio compared to a direction of the beam former.

19. The method of claim 12, comprising adapting the separation of the mixed speech audio by the permutation invariant training based on supervision of a true transcript.

20. A storage device that stores computer-readable instructions that, in response to an execution by a processor, cause the processor to:
process a mixed speech audio received from a microphone;
use permutation invariant training (PIT) to separate and trace speech streams in the mixed speech audio, wherein the PIT includes:
estimate, in a first stage, a first mask by applying a first deep learning model to the mixed speech audio; and
estimate, in a second stage, a second mask by applying a second deep learning model to the first estimated mask and the mixed speech audio;
generate a plurality of separated speech streams from the mixed speech audio for submission to a speech decoder, wherein the plurality of separated speech streams are generated based on the first estimated mask and the second estimated mask; and
decode, using the speech decoder, speech of a first separated speech stream of the plurality of separated speech streams.

21. The storage device of claim 20, wherein:
the plurality of separated speech streams comprises the first separated speech stream and a second separated speech stream; and
wherein the instructions instruct a processor to decode with the speech decoder the speech of the first separated speech stream based on the first separated speech stream and the second separated speech stream.

* * * * *